United States Patent [19]
Nakatsukasa et al.

[11] Patent Number: 5,725,662
[45] Date of Patent: Mar. 10, 1998

[54] PROCESSING SECTION IN GEL COAT PROCESSING UNIT FOR SEEDS

[75] Inventors: Kazushi Nakatsukasa; Yasushi Kohno, both of Susono, Japan

[73] Assignee: Yazaki Corporation, Tokyo, Japan

[21] Appl. No.: 763,438

[22] Filed: Dec. 11, 1996

[30] Foreign Application Priority Data

Dec. 13, 1995 [JP] Japan .................... 7-324677

[51] Int. Cl.$^6$ ............................ B05C 3/00
[52] U.S. Cl. ................. 118/13; 118/26; 118/30; 118/400; 118/407
[58] Field of Search ................... 118/13, 26, 30, 118/400, 407; 427/4

[56] References Cited

U.S. PATENT DOCUMENTS

| | | |
|---|---|---|
| 4,806,357 | 2/1989 | Garrett et al. . |
| 5,080,925 | 1/1992 | Kouno . |
| 5,254,358 | 10/1993 | Kouno et al. . |
| 5,421,882 | 6/1995 | Kouno et al. . |

Primary Examiner—Laura Edwards
Attorney, Agent, or Firm—Armstrong, Westerman Hattori, McLeland & Naughton

[57] ABSTRACT

A processing section in a gel coat processing unit for seeds to uniform the coating amount of seeds with gelatinizer to change a grain diameter of coated seeds without taking plenty of time and labor nor cost. In the processing section the seed is introduced from an outside into a passageway filled with gelatinizer which becomes the polymeric gel by hardening and a coated seed made by coating the seed with the gelatinizer is dropped from the passageway, the processing section comprises: a gel storing section to which the gelatinizer is supplied from an outside, the gel storing section communicating with the passageway; an opening-closing valve for opening and closing an aperture between the passageway and the gel storing section; and an extension-contraction member for extending and contracting an internal space of the gel storing section, the extension-contraction member moving in the gel storing section linked with an opening and closing of the opening-closing valve, the extension-contraction member being movable between a first position where an internal space of the gel storing section has the minimum capacity corresponding to a position when the opening-closing valve is opened and a second position where the internal space of the gel storing section has the maximum capacity which is equal to the minimum capacity plus an amount of the gelatinizer used for the coated seed corresponding to a position when the opening-closing valve is closed.

9 Claims, 10 Drawing Sheets

PROCESSING SECTION IN GEL COAT PROCESSING UNIT FOR SEEDS

BACKGROUND OF THE INVENTION

1. Field of the Invention

The present invention relates to a processing section for coating seeds with gelatinizer which becomes gel after hardening in a gel coat processing unit for manufacturing gel-coated seeds which are seeds coated with polymeric gel.

2. Description of the Related Art

Conventionally, there is known gel-coated seeds which are seeds coated with polymeric gel having elasticity and including nutritive substance or bactericide.

These gel-coated seeds are useful to protect the seeds from a harm of animals' feeding or to sterilize the seeds. In addition, they have a lot of advantages such that planting seeds becomes more efficient by increasing the grain size so that the seeds can be handled more easily and that a germination rate can be improved by an absorption of nutritive substances contained in the polymeric gel.

In the past, the applicant of this invention has proposed a plurality of processing sections in a gel coat processing unit for seeds for manufacturing gel-coated seeds automatically from a viewpoint of the above many advantages.

FIG. 8 is a front view illustrating an example of a conventional device proposed by the applicant of this invention; a gel coat processing unit designated by a general reference numeral 20 in the drawing comprises a stand 21, a seed hopper 22, a seed transfer section 23, a gelatinizer tank 24, a gel processing section 25, a hardening bath 26, and a rinsing bath 27.

The seed hopper 22 is arranged in the upper left of the stand 21 and supported so that it can be raised or lowered via an air cylinder 22a, having a schematically circular form in a top view which is opened upwardly as shown in the top view of FIG. 9, and it contains a large number of seeds (now shown).

The gelatinizer tank 24 is arranged in the lower left of the stand 21 as shown in FIG. 8, and it contains liquid gelatinizer having a high viscosity for coating seeds which becomes polymeric gel after hardening.

The gel processing section 25 is arranged almost in the center of the upper portion of the stand 21; gelatinizer in the gelatinizer tank 24 is supplied to the gel processing section 25 via a tube not shown and coated seeds which are seeds for processing are coated with gelatinizer are produced here.

The seed transfer section 23 is arranged between the seed hopper 22 and the gel processing section 25 above the stand 21 and it comprises a rotary arm 23b of continuous length which is supported rotatably at almost central portion within the horizontal plane by a rotary actuator 23a and two disposable suction tips 23c and 23d removably attached to both ends of the rotary arm 23b.

The above seed transfer section 23 has a structure to repeat alternately a first state that one suction tip 23c is located above the seed hopper 23 and the other suction tip 23d is located above the gel processing section 25 by a rotation in units of 180° of the rotary arm 23b caused by the rotary actuator 23a and a second state that one suction tip 23c is located above the gel processing section 25 and the other suction tip 23d is located above the seed hopper 22.

The hardening bath 26 is extended horizontally from the place of the stand 21 located below the gel processing section 25; the hardening bath 26 contains a flowing liquid hardener which reacts with the gelatinizer covering the above coated seeds and hardens the gelatinizer to make gel-coated seeds from the coated seeds.

In addition, as shown in FIG. 9, in the hardening bath 26 a screw feeder 26a is rotatably accommodated to carry the gel-coated seeds in the longitudinal direction of the hardening bath 26.

The rinsing bath 27 horizontally extends along the above hardening bath 26; the rinsing bath 27 contains a flowing water for rinsing the gel-coated seeds whose gelatinizer is hardened in the hardening bath 26.

In addition, in the rinsing bath 27, a screw feeder 27a is rotatably accommodated to carry the gel-coated seeds in the reverse direction to the hardening bath 26.

In the conventional gel coat processing unit 20 in this configuration, a negative pressure is applied to one of the suction tips 23c and 23d above the seed hopper 22 to raise the seed hopper 22 by means of the air cylinder 22a, the seed in the seed hopper 22 is sucked by the suction tip 23c or 23d, and then the seed hopper 22 is lowered and a positive pressure is applied to the suction tip 23d or 23c above the gel processing section 25 to drop the seed into the gel processing section 25 during the time to repeat the first and second states of the seed transfer section 23, by which each suction tip 23c or 23d repeat the suction and drop of seeds alternatively.

Next, in the gel processing section 25, the seeds dropped from the suction tip 23c or 23d are coated with gelatinizer supplied from the gelatinizer tank 24 and then coated seeds externally coated with gelatinizer are dropped from the gel processing section 25 into the hardening bath 26 by gravity.

Further, while the coated seeds dropped into the hardening bath 26 are transferred by means of a water flow generated by the screw feeder 26a, gel-coated seeds are produced by hardening the gelatinizer used for coating the outside of the coated seeds and the gel-coated seeds which have reached a portion in the hardening bath 26 in the other side in the above width direction are moved to the side of the rinsing bath 27 by getting them over a partition 26b (See FIG. 9) between the hardening bath 26 and the rinsing bath 27 by means of the screw feeder 26a.

Then, while the gel-coated seeds moved to the above rinsing bath 27 are transferred in rinse water in the rinsing bath 27 by means of a water flow generated by the screw feeder 27a, the surfaces of the gel-coated seeds are rinsed and the gel-coated seeds which have reached the end of the rinsing bath 27 after rinsed are moved to a discharge drop orifice 28 (See FIG. 9) of the gel-coated seeds by getting them over a partition 27b (See FIG. 9) at the end of the rinsing bath 27 by means of the screw feeder 27a, and then they are discharged to the outside of the gel coat processing unit 20.

In the gel coat processing unit 20 which performs the above general operation, the gel processing section 25 is conventionally configured as described below.

As shown in a sectional side view of FIG. 10, the gel processing section 25 comprises a nozzle block 31 and a gel containing block 33 connected to the side of the nozzle block 31.

The nozzle block 31 has a passageway 31a which is vertically opened, the passageway 31a consisting of a large diameter portion 31b, a middle diameter portion 31c, and a small diameter portion 31d in order from the upper portion of the nozzle block 31, with a valve 31e having a diameter smaller than that of the small diameter portion 31d formed at the lower end of the passageway 31a and with an external thread 31f formed in an outer circumferential surface of the large diameter portion 31b. Furthermore, a cylindrical plunger 35 in which a passageway 35a is formed is movably accommodated in a vertical direction in the passageway 31a.

The plunger 35 is formed with an outer diameter corresponding to an inner diameter of the middle diameter portion 31c of the passageway 31a and an end of the plunger 35 is formed in a thin diameter portion 35b of the inner diameter corresponding to the valve 31e.

Reference numerals 31g and 31h in FIG. 10 indicate a bushing inserted into and mated with the middle diameter section 31c of the passageway 31a to smooth a vertical movement of the plunger 35 and a ring-shaped rubber seal member, respectively.

With the plunger 35 put in a state of being inserted from the thin diameter portion 35b to the large diameter portion 31b of the passageway 31a, a step portion formed by an inner diameter difference between the thin diameter portion 35b and a plunger 35 portion to the other end of the thin diameter portion 35b is mated with a step portion formed by an inner diameter difference between the bushing 31g and the small diameter portion 31d to restrict a further vertical movement, and a tip of the thin diameter portion 35b closes the valve 31e in this state so that an end of the plunger 35 is located in a place to the middle diameter portion 31c of the large diameter portion 31b and the thin diameter portion. 35b is separated from the valve 31e by an upward motion of the plunger 35 in the passageway 31a to open it in this configuration.

With the tip of the thin diameter portion 35b of the plunger 35 put in a state of closing the valve 31e, a ring-shaped space 31k is formed between the thin diameter portion 35b and the small diameter portion 31d of the passageway 31a, and the space 31k communicates with the side of the gel containing block 33 through a vent hole 31j.

Then, in this state, a cylindrical spring pad 37 is contained in the large diameter portion 31b of the passageway 31a.

The spring pad 37 is formed with a smaller diameter than that of the large diameter portion 31b, a flange 37a is formed with an outer diameter corresponding to the large diameter portion 31b at an end of the spring pad 37, the flange 37a is put in contact with the other end of the plunger 35 in a state of being contained in the large diameter portion 31b of the passageway 31a, the other end of the spring pad 37 protrudes in the upper portion of the passageway 31a, and then a ring-shaped space 37b is formed with being surrounded between an outer circumference of the spring pad 37 and an inner circumference of the large diameter portion 31b of the passageway 31a in this configuration.

In addition, the space 37b contains a coil spring 39, and the coil spring 39 is pushed toward the side of the valve 31e by a cylindrical cap 41 screwed from the outside into the external thread 31f on the outer circumferential surface of the large diameter portion 31b, and then the plunger 35 is urged in a direction such that the thin diameter portion 35b closes the valve 31e via the spring pad 37 due to a spring force of the coil spring 39.

The gel containing block 33 has a gel passageway 33a opening downward and a gel containing section 33b is formed at an end of the gel passageway 33a with a check valve 33c arranged at a lower end of the gel passageway 33a; with a counterflow prevented by this check valve 33c, gelatinizer is supplied to the gel containing section 33b from the gelatinizer tank 24 connected to the lower end of the gel passageway 33a.

Then, the gel containing section 33b communicates with the side of the nozzle block 31 through the vent hole 33d, and the space 31k of the nozzle block 31 communicates with the gel containing section 33b through the vent hole 33d and a vent hole 31j.

Furthermore, an air in the gel containing section 33b is pressed by an extending operation of an air cylinder not shown connected to the side of the gel containing block 33.

In the conventional gel processing section 25 in the above configuration, coated seeds with gelatinizer are produced whenever the valve 31e opens or closes due to a vertical movement of the plunger 35 in the passageway 31a.

More particularly, in a state that gelatinizer supplied from the gelatinizer tank 24 is filled in the gel passageway 33a of the gel containing block 33 through the space 31k of the nozzle block 31 by means of the previous opening and closing the valve 31e and that a gelatinizer film is formed at a lower end of the valve 31e, the seeds sucked by the suction tip 23c are dropped from the upper portion of the gel processing section 25 to the passageway 35a of the plunger 35 via the cap 41 and the spring pad 39 to be introduced and the seeds are received by the gelatinizer film at the lower end of the valve 31e.

In this state, an air in the gel containing section 33b is pressed by the air cylinder not shown to increase the inner internal pressure of the space 31k, by which the plunger 35 goes up in the passageway 31a against the spring force of the coil spring 39 and the thin diameter portion 35b is separated from the valve 31e upwardly so as to open the valve 31e.

Following these movements, the gelatinizer in the space 31k is pushed from the valve 31e to the lower portion of the nozzle block 31, and then the gelatinizer wraps around the seeds being put together with a gelatinizer film which has received the seeds at the lower end of the valve 31e, so that granular coated seeds are made and dropped from the valve 31e to the hardening bath 26 in the lower portion.

When pressing an air in the gel containing section 33b by the air cylinder not shown is stopped and the air cylinder is contracted to return to the previous state almost at the same time when coated seeds drop from the valve 31e, the internal pressure of the space 31k is decreased to follow it and then the spring force of the coil spring 39 becomes greater than the pressure to the space 31k, so that the plunger 35 moves down in the passageway 31a due to urging by the coil spring 39, and the valve 31e is closed by the lower end of the thin diameter section 35b to complete the drop of coated seeds.

At this point, gelatinizer attached to the valve 31e at the dropping of the coated seeds remains in a form of a film at the lower end of the valve 31e and gelatinizer equal to the amount of the gelatinizer reduced by the dropping from the valve 31e is supplied from the gelatinizer tank 24 to the gel passageway 33a.

As described above, the conventional gel processing section 25 has a configuration in which the plunger 35 is moved upward in the passageway 31a to open the valve 31e by pressing an air in the gel containing section 33b by means of the air cylinder not shown in a state that gelatinizer supplied from the gelatinizer tank 24 is filled in the gel passageway 33a of the gel containing block 33 through the space 31k of the nozzle block 31.

Accordingly, if a viscosity of the gelatinizer changes due to an increase or a decrease of a temperature or a bubble is mixed in the gelatinizer supplied from the gelatinizer tank 24 to the gel passageway 33a of the gel containing block 33, a dispersion occurs in the pressing force to the gel containing section 33b with the air cylinder, which causes differences in a time period in which the plunger 35 opens the valve 31e or a size of the opening of the valve, therefore, the conventional apparatus has a disadvantage that a grain diameter of coated seeds dropped from the valve 31a, in other words, the amount of gelatinizer coating around the seeds is not fixed or loading in the valve 31e is caused by the gelatinizer or seeds.

In addition, the above conventional gel processing section 25 requires to attach a selected nozzle having a corresponding inner diameter to the valve 31e for changing a grain diameter of coated seeds, therefore, it has a disadvantage that it takes plenty of time for replacement and a cost of preparing a plurality of types of nozzles.

SUMMARY OF THE INVENTION

The present invention has been made in view of the foregoing, and it is the first object of this invention to provide a processing section in a gel coat processing unit for seeds to uniform the coating amount of seeds with gelatinizer, that is, the grain diameter of coated seeds independently of the environmental conditions such as an ambient temperature or mixed bubbles in supplied gelatinizer when coating seeds with gelatinizer, and it is the second object to provide a processing section in a gel coat processing unit for seeds to change a grain diameter of coated seeds without taking plenty of time and labor nor cost.

Therefore, to achieve the first object, in the processing section in a gel coat processing unit for seeds according to the present invention, the seed is introduced from an outside into a passageway filled with gelatinizer which becomes the polymeric gel by hardening and a coated seed made by coating the seed with the gelatinizer is dropped from the passageway, comprising: a gel storing section to which the gelatinizer is supplied from an outside, the gel storing section communicating with the passageway; an opening-closing valve for opening and closing an aperture between the passageway and the gel storing section; and an extension-contraction member for extending and contracting an internal space of the gel storing section, the extension-contraction member moving in the gel storing section linked with an opening and closing of the opening-closing valve, the extension-contraction member being movable between a first position where an internal space of the gel storing section has the minimum capacity corresponding to a position when the opening-closing valve is opened and a second position where the internal space of the gel storing section has the maximum capacity which is equal to the minimum capacity plus an amount of the gelatinizer used for the coated seed corresponding to a position when the opening-closing valve is closed.

Furthermore, the processing section in a gel coat processing unit for seeds preferably further comprises: a pipe for discharging compressed air into the gelatinizer in the passageway with a tip thereof inserted into the passageway to introduce the seed from an outside of the passageway into a stagnant air generated at a portion of the gelatinizer faced by the tip of the pipe in the passageway due to the compressed air.

In addition, in the processing section in a gel coat processing unit for seeds described above, the tip of the pipe is preferably inserted from an upper portion into the passageway, and an open space may be formed between an outside wall of the tip of the pipe and an inside wall of the passageway such that an upper portion thereof from the tip of the pipe is closed and a lower portion thereof below the tip of the pipe is opened, and the space communicates with the outside of the passageway so that an aperture between them can be opened and closed by means of an air vent valve.

To achieve the second object, in the processing section in a gel coat processing unit for seeds described above, supplying pressure for the gelatinizer supplied from an outside to the gel storing section is increased and decreased according to a grain diameter of the coated seed dropped from the passageway.

Further, in the processing section in a gel coat processing unit for seeds according to the present invention, the opening-closing valve and the extension-contraction member are preferably fixed to a piston rod of a cylinder continuously arranged in an outside of the gel storing section, the piston rod being inserted toward a place of the internal space of the gel storing section communicating with the passageway from an outside of the gel storing section.

Still further, it is preferable that the cylinder is composed of an air cylinder operated by means of compressed air and the extension-contraction member is composed of a diaphragm removably attached to the piston rod inserted to the place of the internal space of the gel storing section.

In the aforementioned processing section in a gel coat processing unit for seeds according to the present invention, compressed air may be supplied from a common supply source to the air cylinder and the pipe.

It is preferable that, in the processing section in a gel coat processing unit for seeds according to the present invention, a shift stroke of the piston rod caused by an operation of the cylinder is preferably increased and decreased according to a grain diameter of the coated seed dropped from the passageway.

Furthermore, the processing section in a gel coat processing unit for seeds according to the present invention described above, a time period during which the opening-closing valve opens an aperture between the passageway and the gel storing section by means of the operation of the cylinder can be increased and decreased according to a grain diameter of the coated seed dropped from the passageway.

According to a processing section in a gel coat processing unit for seeds of the present invention, with interlocked with a shift from an opened valve state to a closed valve state of the opening-closing valve for opening or closing an aperture between the passageway filled with gelatinizer into which a seed is introduced from the outside and the gel storing section communicating with it, the extension-contraction member in the gel storing section moves from the maximum place at which the internal space of the gel storing section has the maximum capacity to the minimum place at which it has the minimum capacity, by which gelatinizer by the amount in use for coating a seed equal to a difference between the maximum capacity and the minimum capacity flows into the passageway from the internal space of the gel storing section to the passageway through the opening-closing valve and then the gelatinizer filled in the passageway is dropped from the passageway with the seed introduced from the outside.

Accordingly, it becomes possible to uniform an amount of gelatinizer coating for a seed, in other words, a grain diameter of a coated seed by dropping gelatinizer of a uniform amount from the passageway independently of environmental conditions such as an ambient temperature or bubbles mixed in gelatinizer, compared with the conventional apparatus in which a valve is opened by moving a plunger to drop gelatinizer by means of an increase or a decrease of a filling pressure of the gelatinizer in a space.

According to a processing section in a gel coat processing unit for seeds of the present invention, a bubble is wrapped with a seed by gelatinizer when the gelatinizer is dropped from the passageway, therefore, it becomes possible to secure oxygen needed for germination of the seed in the coated seed due to this bubble.

Further, according to a processing section in a gel coat processing unit for seeds of the present invention, out of the compressed air discharged from the tip of the pipe inserted from the upper portion to the passageway into the gelatinizer in the passageway, compressed air of an amount greater than the amount needed for generating a stagnant air in the portion of the gelatinizer faced by the tip of the pipe stagnates in a space between the outside wall of the tip of the pipe and the inside wall of the passageway and the stagnant compressed air is discharged to an outside of the passageway via the air vent valve.

Accordingly, it becomes possible to prevent a generation of a stagnant air too large to be wrapped with a seed by gelatinizer due to an excess compressed stagnant air in the passageway.

Still further, according to a processing section in a gel coat processing unit for seeds of the present invention, the grain diameter of a coated seed dropped from the passageway is adjusted according to an increase or decrease of the supply pressure to the gelatinizer supplied from the outside to the gel storing section, therefore, it becomes possible to change the size of the grain diameter of the coated seed without additional cost.

Even further, according to a processing section in a gel coat processing unit for seeds of the present invention, an extending or contracting operation of the cylinder connected to the outside portion of the gel storing section integrally moves the opening-closing valve and the extension-contraction member fixed to the piston rod inserted toward the place in the internal space of the gel storing section communicating with the passageway from the outside of the gel storing section together with the piston rod, therefore, it becomes possible to achieve easily an operation of the extension-contraction member interlocked with the opening-closing valve.

Furthermore, according to a processing section in a gel coat processing unit for seeds of the present invention, it becomes possible to make easily a gel processing section only by adding the gel storing section and the diaphragm with applying a commercially-available air cylinder due to the air cylinder configuration in which the cylinder operates by means of compressed air and a use of the diaphragm as an extension-contraction member removably attached to the piston rod portion of the air cylinder inserted toward the place of the internal space of the gel storing section.

Still further, according to a processing section in a gel coat processing unit for seeds of the present invention, the supply source for supplying compressed air to the pipe is used also as a supply source for supplying compressed air to the air cylinder, therefore, it becomes possible to simplify the configuration with the common use of the power source.

In the same manner, according to a processing section in a gel coat processing unit for seeds of the present invention, with an increase of a decrease of a stroke of a movement of the piston rod inserted toward the place in the internal space of the gel storing section caused by an operation of the cylinder continuously arranged in the outside portion of the gel storing section, and according to a processing section in a gel coat processing unit for seeds of the present invention, with an increase or decrease of the time period during which the opening-closing valve opens or closes the aperture between the passageway and the gel storing section by means of the operation of the cylinder, it becomes possible to change the size of the grain diameter of the coated seed without additional cost.

BRIEF DESCRIPTION OF THE DRAWINGS

The present invention will be more apparent from the ensuring description with reference to the accompanying drawings wherein.

DETAILED DESCRIPTION OF THE PREFERRED EMBODIMENTS

Embodiments of a processing section in a gel coat processing unit fop seeds of this invention will be described below based on the accompanying drawings.

Figure 1:
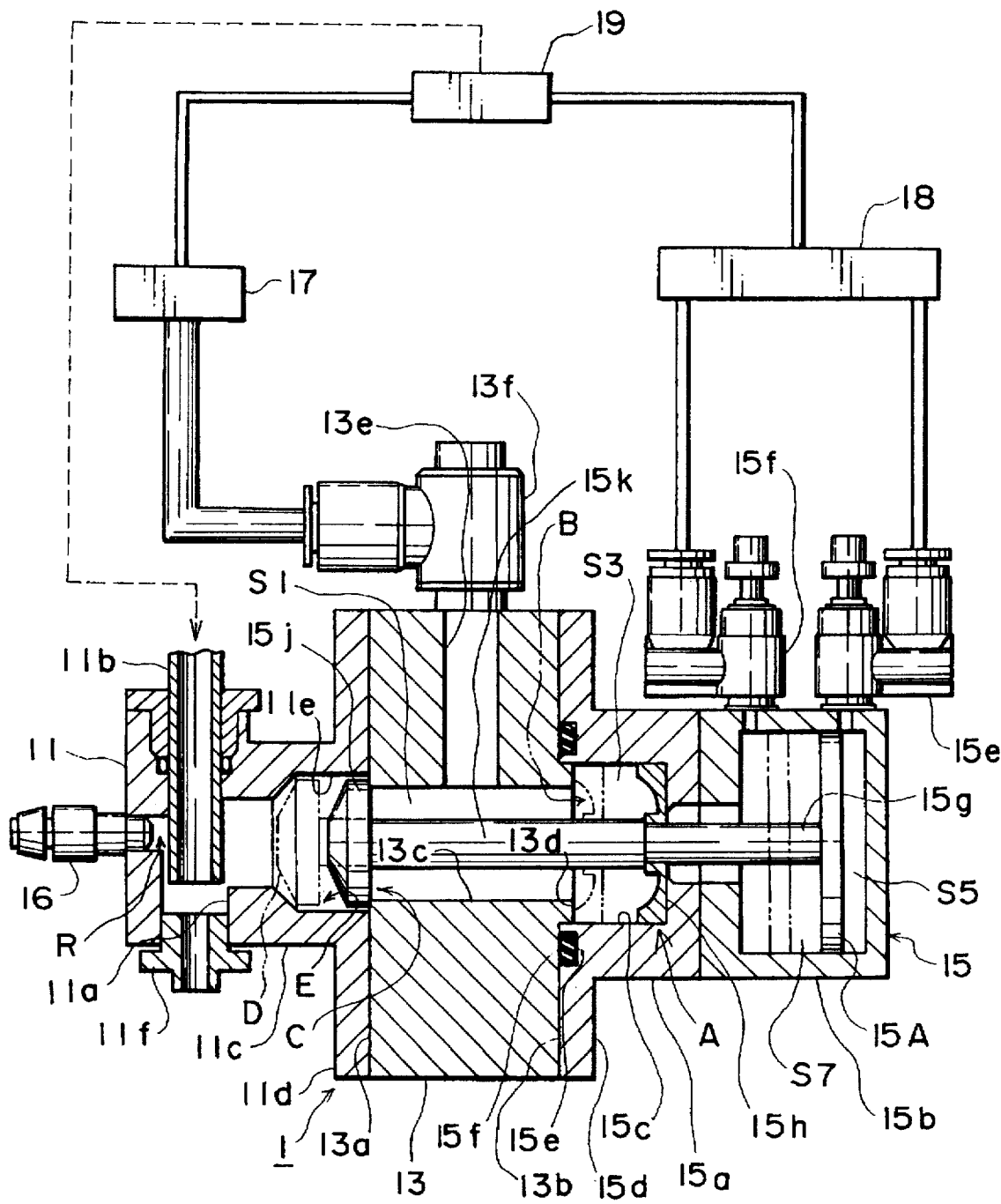
FIG. 1 is an elevational cross section illustrating a schematic configuration of a gel coat processing section for seeds according to an embodiment of this invention.
Figure 8:
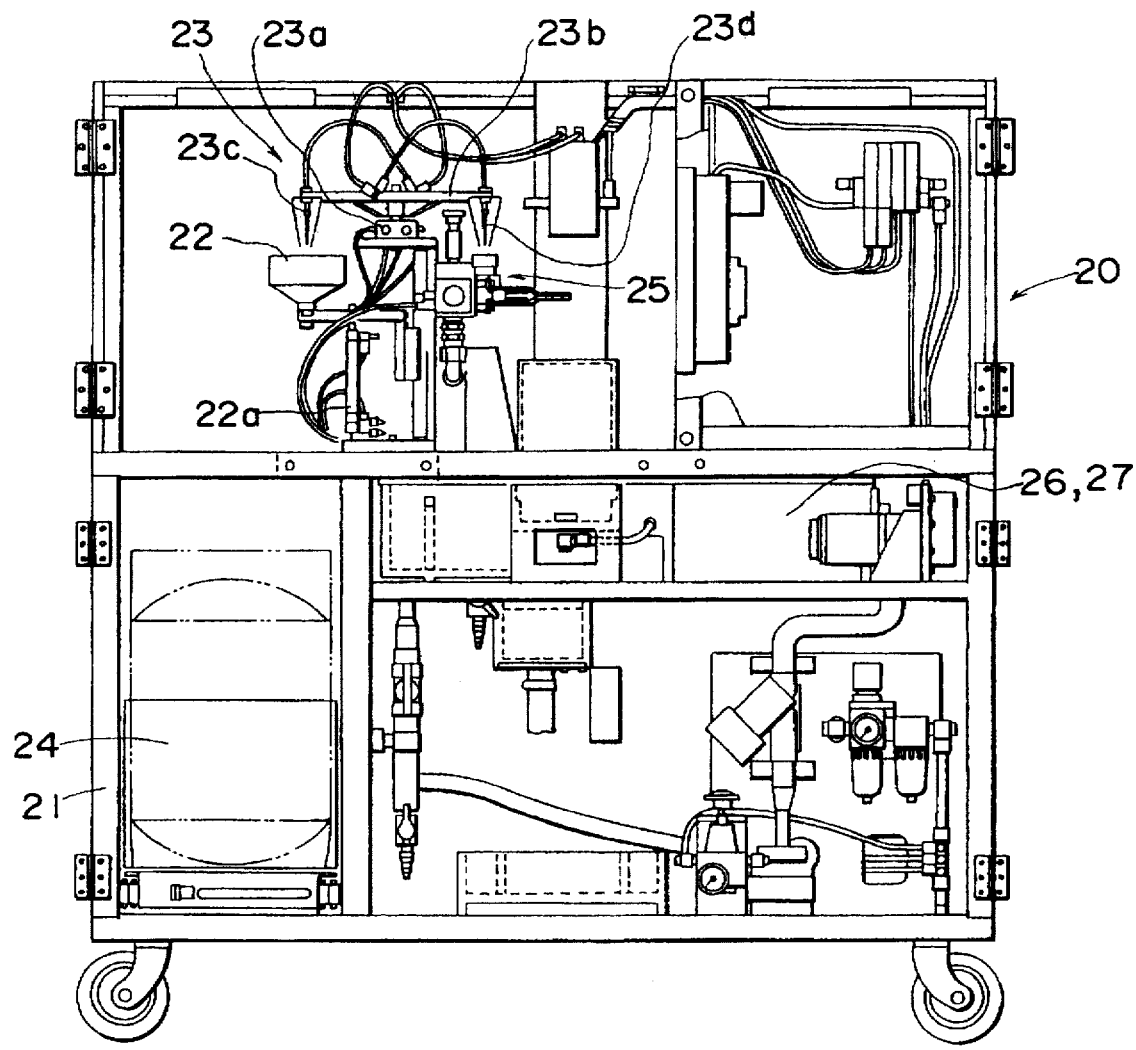
FIG. 8 is an elevational view illustrating an example of a gel coat processing unit.
Figure 9:
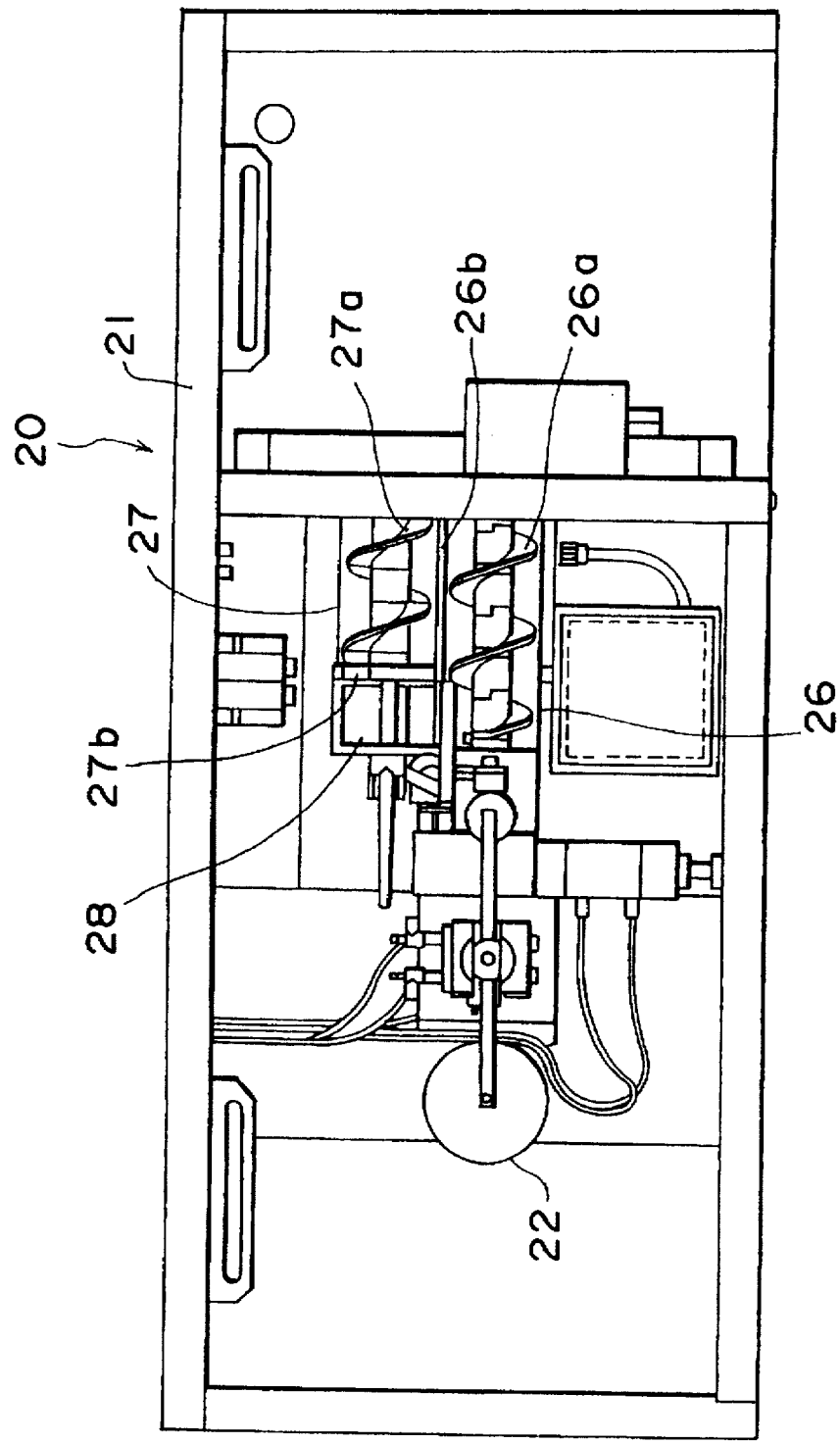
FIG. 9 is a plan view illustrating the gel coat processing unit shown in FIG. 8.
Figure 10:
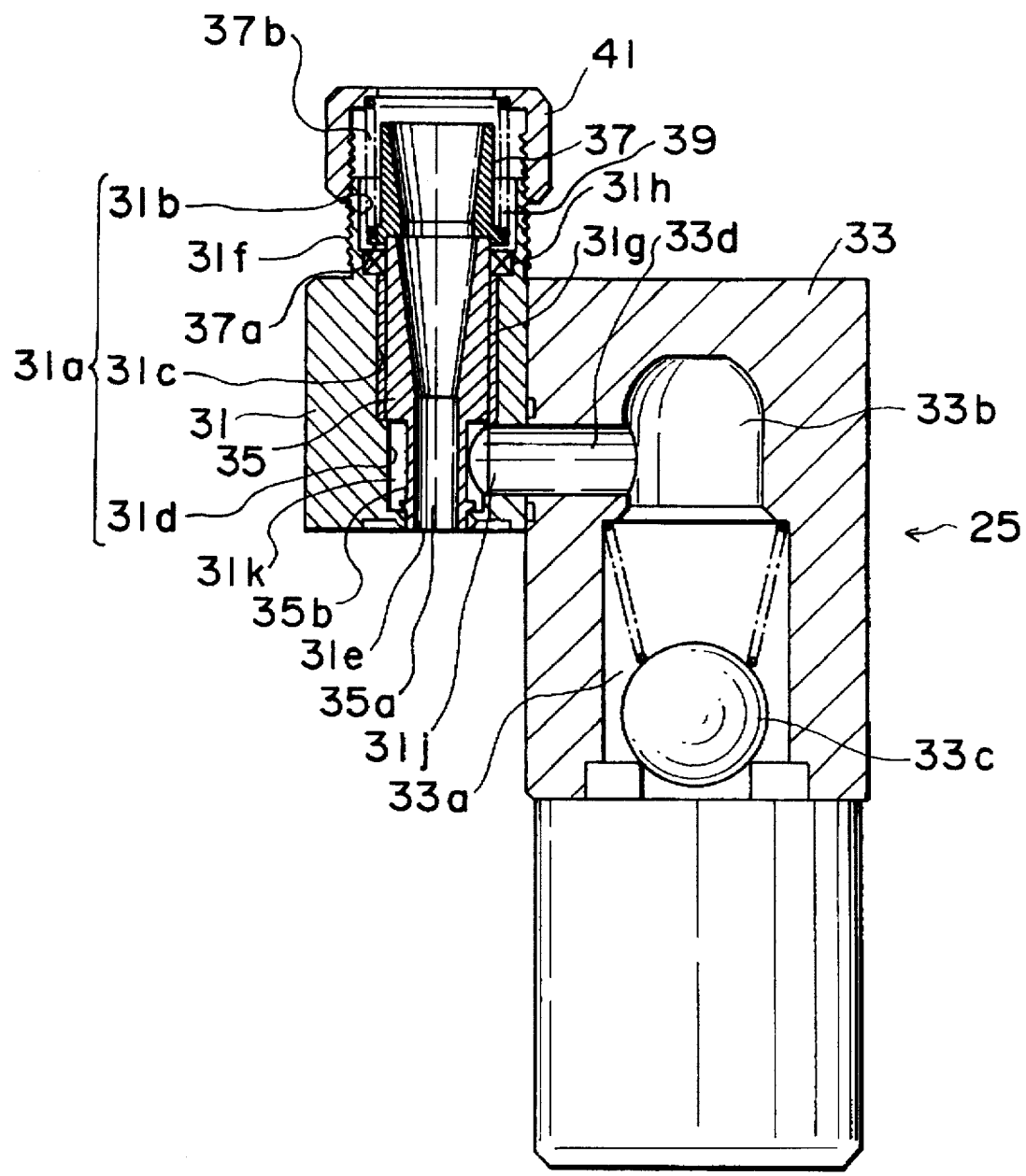
FIG. 10 is a sectional side elevation illustrating a schematic configuration of a conventional gel coat processing section applied to the gel coat processing unit shown in FIG. 8.

Referring to FIG. 1, there is shown an elevational cross section illustrating a schematic configuration of a gel coat processing section for seeds related to an embodiment of this invention applicable to, for example, a gel processing section in a gel coat processing unit shown in FIGS. 8 and 9, and a gel coat processing section 1 of this embodiment has a nozzle block 11 for coating a seed X (See FIG. 4) with gelatinizer Y (See FIG. 2), a gel containing block 13 for storing the gelatinizer Y to be supplied to the nozzle block 11, and a cylinder block 15 for supplying the gelatinizer Y stored in the gel containing block 13 into the nozzle block 11.

The aforesaid nozzle block 11 contains a passageway 11a opening vertically and a seed supply pipe 11b (equivalent to a pipe) from the upper portion of the nozzle block 11 is inserted to this passageway 11a.

A substantially cylindrical gel cylinder 11c is protruded in the almost middle place in a vertical direction in the side portion of the nozzle block 11, a ring-shaped flange 11d is formed at a tip of the gel cylinder 11c, the almost middle portion of the tip surface of the flange 11d communicates with the above-mentioned passageway 11a through a cylinder chamber 11e in the gel cylinder 11c, and the lower end of the pipe 11b for supplying seeds is located in a higher portion than the lower end of the cylinder chamber 11e.

Further, at a portion of the lower end of the passageway 11a and at a bottom of the nozzle block 11, a nozzle 11f for discharging the gelatinizer Y is screwed.

Furthermore, a space R is formed with a little width between an outside wall at the lower end of the seed supply pipe 11b located in the aforesaid passageway 11a and an inside wall of the passageway 11a, the space R communicates with an air straight 16 (equivalent to an air vent valve) removably attached to the outside of the nozzle block 11, and a stagnant air in the space R is discharged to the outside of the nozzle block 11 by opening a valve (not shown) of the air straight 16 in this configuration.

The aforesaid gel containing block 13 has a pair of sides 13a and 13b on the right and left opposing each other having a shape corresponding to the above flange 11d, and between the almost middle portions of the both sides 13a and 13b, a gel containing chamber 13c is formed with a smaller inner diameter than that of the above-mentioned cylinder chamber 11e.

The gel containing block 13 has a configuration that the cylinder chamber 11e and the gel containing chamber 13c are located on a concentric circle with the side 13a put in contact with the top surface of the flange 11d and the nozzle block 11 fixed with screws (not shown).

At a peripheral edge of the gel containing chamber 13c on the right side 13b of the gel containing block 13, a substantially ring-shaped mating projection 13d is expansively formed, and the almost middle portions of the both left and right sides 13a and 13b in the gel containing chamber 13c are opened to the outward of the gel containing block 13 through the gel passageway 13e and the gel passageway 13e is connected to a storing tank 17 for the gelatinizer Y through a joint 13f and a high-pressure tube not shown.

The cylinder block 15 has an adapter 15a and an air cylinder 15b connected to the gel containing block 13 via this adapter 15a.

The adapter 15a has a gel pumping chamber 15c having an inner diameter corresponding to the mating projection 13d of the gel containing block 13 and a substantially recess-shaped section, a flange 15d is formed with a shape corresponding to the right side 13b of the gel containing block 13 at the end of the adapter 15a where the gel pumping chamber 15c is opened, a ring-shaped flute 15e is formed at an end surface of the flange 15d and at a peripheral edge of the gel pumping chamber 15c, and a rubber O-ring 15f for sealing is contained in this flute 15e.

The adapter 15a has a configuration that a circumferential surface of the O-ring 15f in the flute 15e which is partially protruded from the flange 15d is put into contact by pressure with the right side 13b around the mating projection 13d in the gel containing block 13 with the tip surface of the flange 15d put in contact with the right side 13b and fixed to the gel containing block 13 with screws (not shown), by which the gel containing chamber 13c communicates with the gel pumping chamber 15c and they are shielded from the outside of the gel containing block 13 and the adapter 15a.

In the drawing, reference symbols S1 and S3 indicate internal spaces of the gel containing chamber 13c and the gel pumping chamber 15c, respectively, therefore, in this embodiment, the gel storing section according to the present invention consists of the gel containing chamber 13c and the gel pumping chamber 15c and the internal space of the gel storing section consists of the internal space S1 of the gel containing chamber 13c and the internal space S3 of the gel pumping chamber 15c.

The aforesaid air cylinder 15b (corresponding to a cylinder) has two speed controllers 15e and 15f; the speed controllers 15e and 15f communicate with two chambers S5 and S7 which are shielded each other and generated separately in the both sides of the piston 15A in the air cylinder 15b, respectively.

The air cylinder 15b has a configuration that, with introducing compressed air from the speed controller 15e to one chamber S5, a rod 15g of the air cylinder 15b is extended to move a diaphragm 15h (an extension-contraction member, corresponding to a piston diaphragm) fixed in the top of the rod 15g from a suction place A (corresponding to the maximum place) in the innermost portion of the gel pumping chamber 15c indicated by a solid line in FIG. 1 to a discharge place B (corresponding to the minimum place) in contact with an end of the mating projection 13d indicated by a phantom line, and with introducing compressed air from the speed controller 15f to the other chamber S7, the piston rod 15g is contracted to move the diaphragm 15h from the discharge place B to the suction place A.

In this embodiment, the diaphragm 15h has a configuration that the outer circumferential surface thereof is in contact with the inner circumferential surface of the air cylinder 15b so as to always secure water-tightness and air-tightness between them and also has a configuration that the volume difference of the gel pumping chamber 15c on the side of the gel containing chamber 13c from the diaphragm 15h to be extended or contracted by the movement of the rod 15g and the joint rod 15k from the suction place A to the discharge place B is close to an amount of gelatinizer Y required for a coated seed to be dropped from the discharge nozzle 11f to the lower portion of the nozzle block 11.

Additionally, the joint rod 15k is connected to the tip of the rod 15g, and an opening-closing valve 15j movable in a direction of approaching separately to the passageway 11a in the cylinder chamber 11e is removably attached to the tip of the joint rod 15k with screws, and the opening-closing valve 15j is formed with an outer diameter smaller than an inner diameter of the cylinder chamber 11e.

Therefore, the opening-closing valve 15j is located in a closing place C for closing a gap between the cylinder chamber 11e and the gel containing chamber 13c with put into the left side 13a of the gel containing block 13 as indicated by a solid line in FIG. 1 when the rod 15g and the joint rod 15k are contracted, and is located in an opening place D for opening the gel containing chamber 13c and the cylinder chamber 11e so as to communicate with each other through a gap E to the cylinder chamber 11e formed around the opening-closing valve 15j with separating it from the left side 13a of the gel containing block 13 as indicated by a phantom line in FIG. 1 when the rod 15g and the joint rod 15k are extended.

Furthermore, reference numerals 18 and 19 in FIG. 1 indicate a solenoid valve and an air compressor (corresponding to a source of compressed air), respectively; the air compressor 19 supplies compressed air to the storing tank 17 and the solenoid valve 18 and also supplies a low-pressure compressed air to a middle portion of the seed supply pipe 11b via a pressure reducing device not shown.

In this embodiment, a piston rod of the processing section in a gel coat processing unit for seeds according to the present invention comprises the rod 15g and the joint rod 15k.

The solenoid valve 18 has a configuration to send selectively compressed air sent from the air compressor 19 by switching with a control of a sequencer not shown from the speed controller 15e to one chamber S5 of the air cylinder 15b and from the speed controller 15f to the other chamber S7 of the air cylinder 15b.

Further, the storing tank 17 has a configuration that the internal gelatinizer Y is sent to the gel passageway 13e via a high-pressure tube and the joint 13f with pressure by means of compressed air from the air compressor 19.

Still further, the seed supply pipe 11b has a configuration to discharge an air with slight pressure from its lower end inserted to the passageway 11a toward the inside of the passageway 11a by means of compressed air supplied to the middle portion via the pressure reducing device from the air compressor 19.

Subsequently, the operation of the gel coat processing section 1 of this embodiment as configured in the above will be explained below by using FIGS. 2 to 7.

Figure 2:
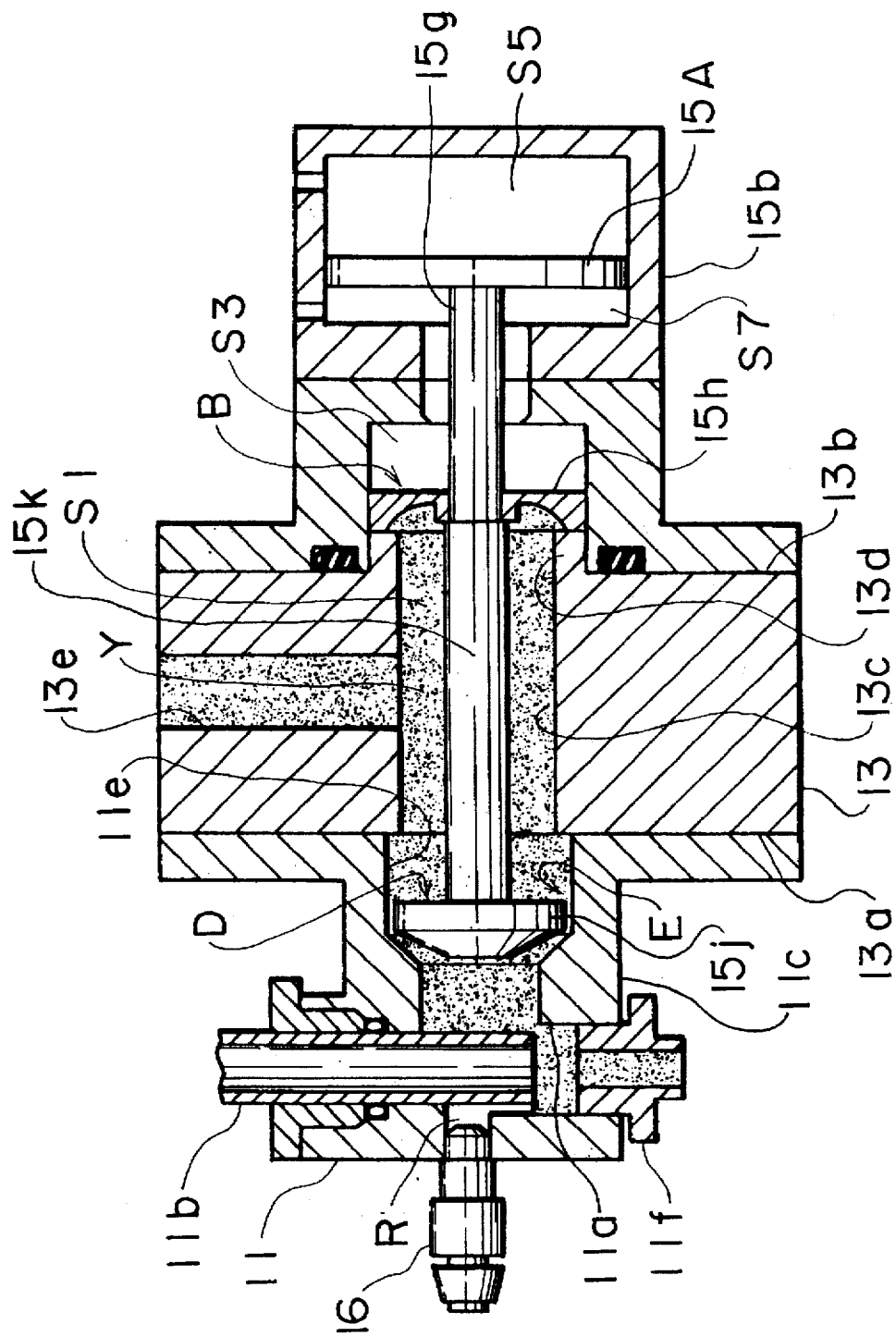
FIG. 2 is an explanation diagram illustrating an operation of the gel coat processing section shown in FIG. 1.

Firstly, the solenoid valve 18 is switched to the speed controller 15e to introduce compressed air from the air compressor 19 to one chamber S of the air cylinder 15b so that the rod 15g extends with the joint rod 15k as shown in FIG. 2, and as a result, the diaphragm 15h is moved from the suction place A of the gel pumping chamber 15c to the discharge place B so as to be put into contact with the end of the mating projection 13d and the opening-closing valve 15j is moved from the closing place C to the opening place D so as to be separated from the left side 13a of the gel containing block 13.

Then, the gelatinizer Y in the storing tank 17 is sent by pressure to the gel passageway 13e with pressure according to compressed air from the air compressor 19, by which the gel containing chamber 13c and a portion of the cylinder chamber 11e on the side of the gel containing chamber 13c from the opening-closing valve 15j are filled with the gelatinizer Y and a portion of the cylinder chamber 11e on the side of the passageway 11a from the opening-closing valve 15j and the entire passageway 11a are filled with the gelatinizer Y through the gap E between the cylinder chamber 11e and the opening-closing valve 15j.

At filling with the gelatinizer Y, a back current of the gelatinizer Y from the lower end of the seed supply pipe 11b to the inside is blocked by slight air discharged from the lower end of the seed supply pipe 11b located in the passageway 11a.

Figure 3:
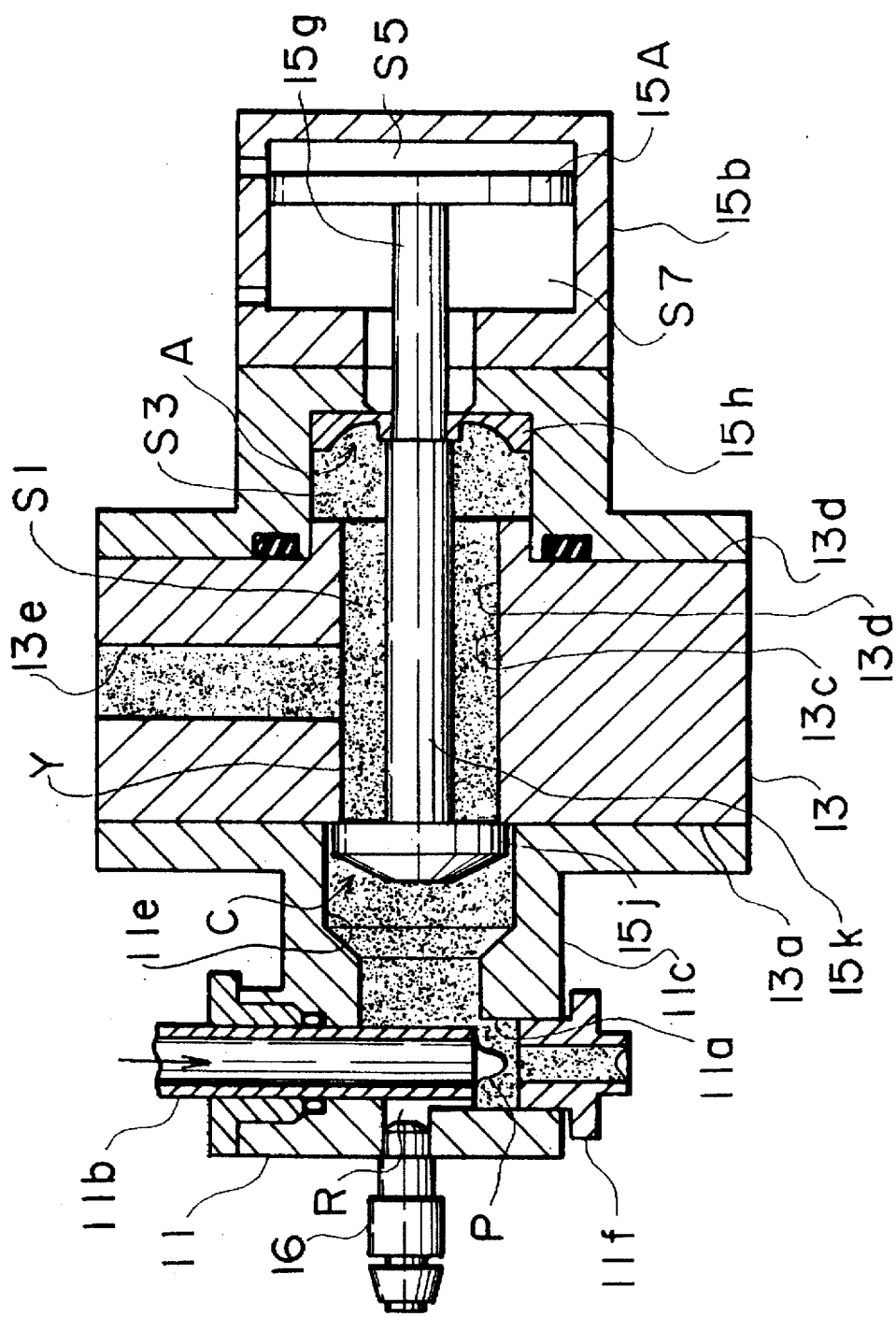
FIG. 3 is an explanation diagram illustrating an operation of the gel coat processing section shown in FIG. 1.

Next, the solenoid valve 18 is switched to the side of the speed controller 15f to introduce compressed air from the air compressor 19 to the other chamber S7 of the air cylinder 15b to contract the rod 15g together with the joint rod 15k as shown in FIG. 3, so that the diaphragm 15h is moved from the discharge place B of the gel pumping chamber 15c to the suction place A so as to be put into contact with the innermost portion of the gel pumping chamber 15c, and the opening-closing valve 15j is moved from the opening place D to the closing place C so as to be put into contact with the left side 13a of the gel containing block 13.

As a result, a part of the gelatinizer Y in the portion of the cylinder chamber 11e on the side of the gel containing chamber 13c from the opening-closing valve 15j moves to the side of the passageway 11a from the opening-closing valve 15j through the gap E between the cylinder chamber 11e and the opening-closing valve 15j and remains in the cylinder chamber 11e, while other most gelatinizer Y flows into the gel containing chamber 13c being pressed by the opening-closing valve 15j with a movement of the opening-closing valve 15j and the diaphragm 15h.

Accordingly, the amount of the gelatinizer Y in the cylinder chamber 11e is decreased by the amount of gelatinizer Y which has flown into the gel containing chamber 13c being pressed by the opening-closing valve 15j, therefore, a filling pressure of the gelatinizer Y in the cylinder chamber 11e and the passageway 11a becomes negative, by which the gelatinizer Y at the lower end of the discharge nozzle 11f is lifted slightly upward.

In addition, when the rod 15g is contracted together with the joint rod 15k, most gelatinizer Y in the portion of the cylinder chamber 11e on the side of the gel containing chamber 13c from the opening-closing valve 15j flows into the gel containing chamber 13c, and the gelatinizer Y sent by pressure from the inside of the storing tank 17 to the gel passageway 13e flows into the gel containing chamber 13c, and then the gelatinizer Y in the gel containing chamber 13c flows into the portion of the gel pumping chamber 15c on the side of the gel containing chamber 13c from the diaphragm 15h in such a manner that it is pressed away by the gelatinizer Y which has flown.

As a result, the gel containing chamber 13c closed by the opening-closing valve 15j and the portion of the gel pumping chamber 15c in the side of the gel containing chamber 13c from the diaphragm 15h are filled with gelatinizer Y and then the filling pressure of the gelatinizer Y exceeds the sending pressure of the gelatinizer Y from the inside of the storing tank 17 to the gel passageway 13e, which stops further sending gelatinizer Y by pressure to the gel passageway 13e.

Then, in a place of the gelatinizer Y at the lower portion of the seed supply pipe 11b out of the gelatinizer Y in the passageway 11a, a stagnant air P having a given size is generated due to slight air discharged from the seed supply pipe 11b.

At this point, if the stagnant air P is going to exceed the given size due to continued discharge of the slight air from the seed supply pipe 11b, excess air stagnates in a space R between an outer circumferential wall at the lower end of the seed supply pipe 11b and an inside wall of the passageway 11a, therefore, no stagnant air P having a size exceeding the given size is generated.

The excess air in the space R is discharged to the outside of the nozzle block 11 by opening an air straight 16.

Figure 4:
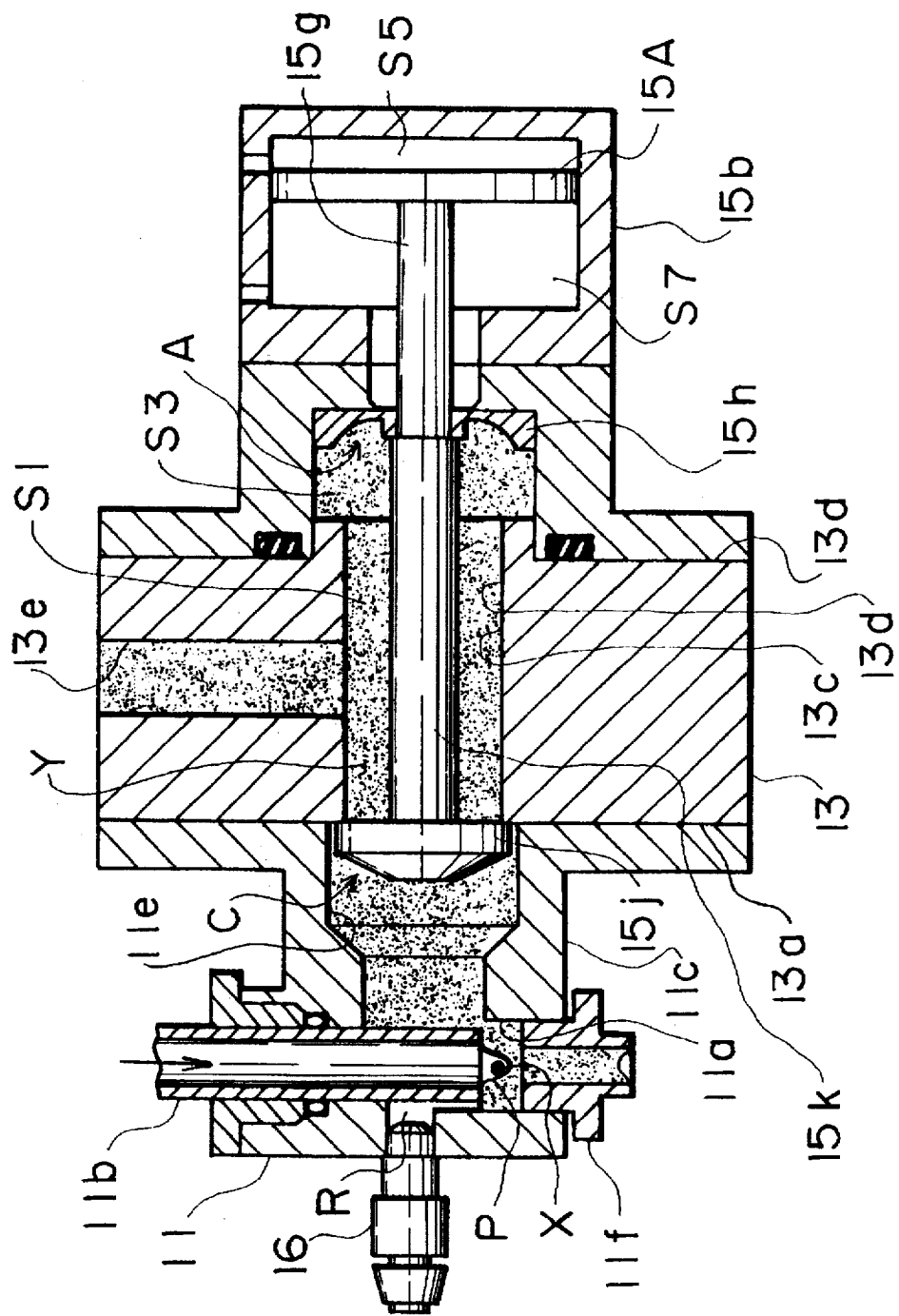
FIG. 4 is an explanation diagram illustrating an operation of the gel coat processing section shown in FIG. 1.

Subsequently, as shown in FIG. 4, a seed X is put into the seed supply pipe 11b from the upper portion of the nozzle block 11, and the seed X is carried to the lower portion of the seed supply pipe 11b with a flow of slight air in the seed supply pipe 11b so that it reaches the inside of the stagnant air P generated at a place of gelatinizer Y in the lower portion of the seed supply pipe 11b.

Figure 5:
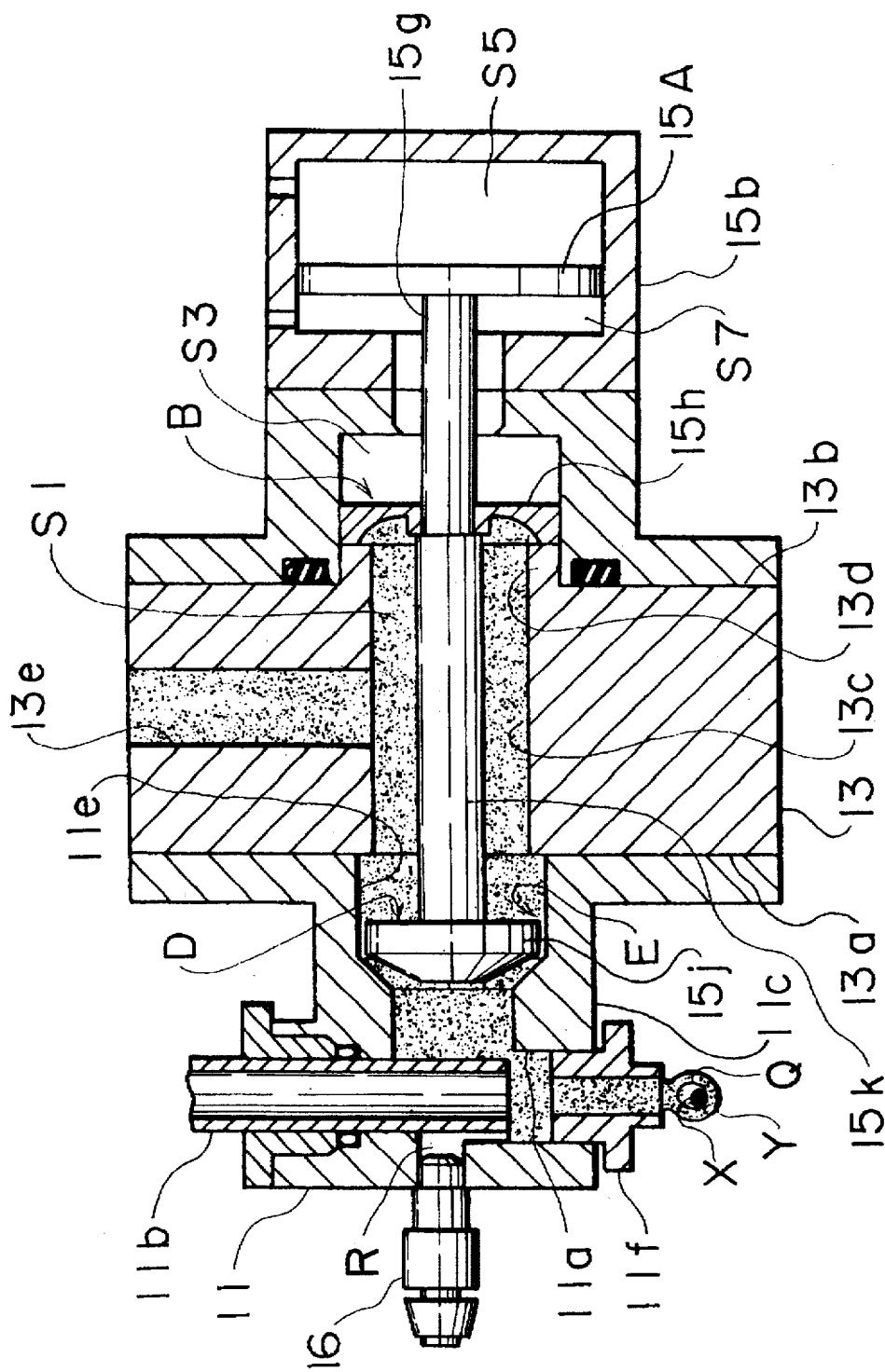
FIG. 5 is an explanation diagram illustrating an operation of the gel coat processing section shown in FIG. 1.

Further, with switching the solenoid valve 18 to the side of the speed controller 15e, the rod 15g is extended together with the joint rod 15k as shown in FIG. 5 to move the diaphragm 15h from the suction place A in the gel pumping chamber 15c to the charge place B thereof and to move the opening-closing valve 15j from the closing place C to the opening place D.

As a result, the gelatinizer Y in the gel pumping chamber 15c is discharged to the gel containing chamber 13c being pressed by the diaphragm 15h, and the gelatinizer Y in the gel containing chamber 13c flows into a portion of the cylinder chamber 11e on the side of the gel containing chamber 13c from the opening-closing valve 15j such that the gelatinizer Y is pressed away by the discharged gelatinizer Y.

Then, the gelatinizer Y in the portion of the cylinder chamber 11e on the side of the gel containing chamber 13c from the opening-closing valve 15j flows into the portion of the cylinder chamber 11e on the side of the passageway 11a from the opening-closing valve 15j through a gap E between the opening-closing valve 15j and the cylinder chamber 11e such that it is pressed away by the gelatinizer Y which has flown into the portion on the side of the gel containing chamber 13c, and the gelatinizer Y in the portion of the cylinder chamber 11e on the side of the passageway 11a from the opening-closing valve 15j such that it is pressed away by the gelatinizer Y which has flown into the portion on the side of the passageway 11a.

Figure 6:
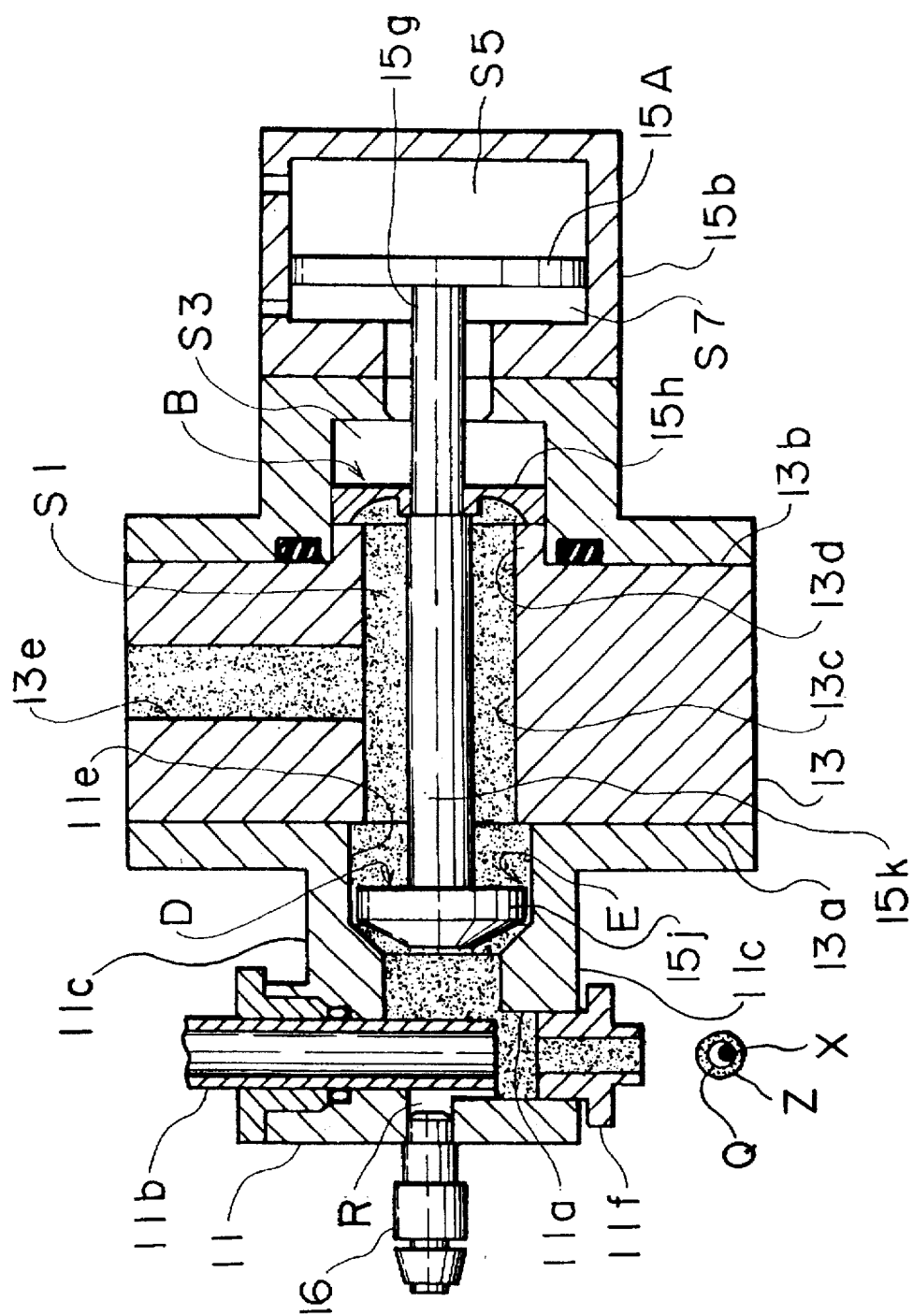
FIG. 6 is an explanation diagram illustrating an operation of the gel coat processing section shown in FIG. 1.

Furthermore, the gelatinizer Y in the passageway 11a is discharged downward from the discharge nozzle 11f so as to wrap the stagnant air P in the lower portion of the seed supply pipe 11b and the processing seed X in it such that it is pressed away by the gelatinizer Y, the gelatinizer Y wrapping the processing seed X and a bubble Q made from the stagnant air P hangs down from the discharge nozzle 11f in a form of a drop, and gelatinizer Y hanging down in a form of a drop is dropped from the nozzle block 11 with a force of the discharge of the gelatinizer Y as a granular coated seed Z wrapping the bubble Q and the processing seed X as shown in FIG. 6.

Since the opening-closing valve 15j is located in the opening place D which is separated from the right side 13b of the gel containing block 13 in this state, the gel containing chamber 13c, the gel pumping chamber 15c, and the gel passageway 13e are not closed by the opening-closing valve 15j, therefore, the filling pressure of the gelatinizer Y filled in these portions is lower than the sending pressure of the gelatinizer from the inside of the storing tank 17 to the gel passageway 13e.

Accordingly, the gelatinizer Y from the storing tank 17 flows from the gel passageway 13e to the gel containing chamber 13c, and the gelatinizer Y based on the amount of the gelatinizer which has flown from the cylinder chamber 11e to the passageway 11a through the gap E between the opening-closing valve 15j and the cylinder chamber 11e to supply the gelatinizer Y to the passageway 11a by the amount of the gelatinizer Y which has been decreased with hanging in a form of a drop from the discharge nozzle 11f.

Figure 7:
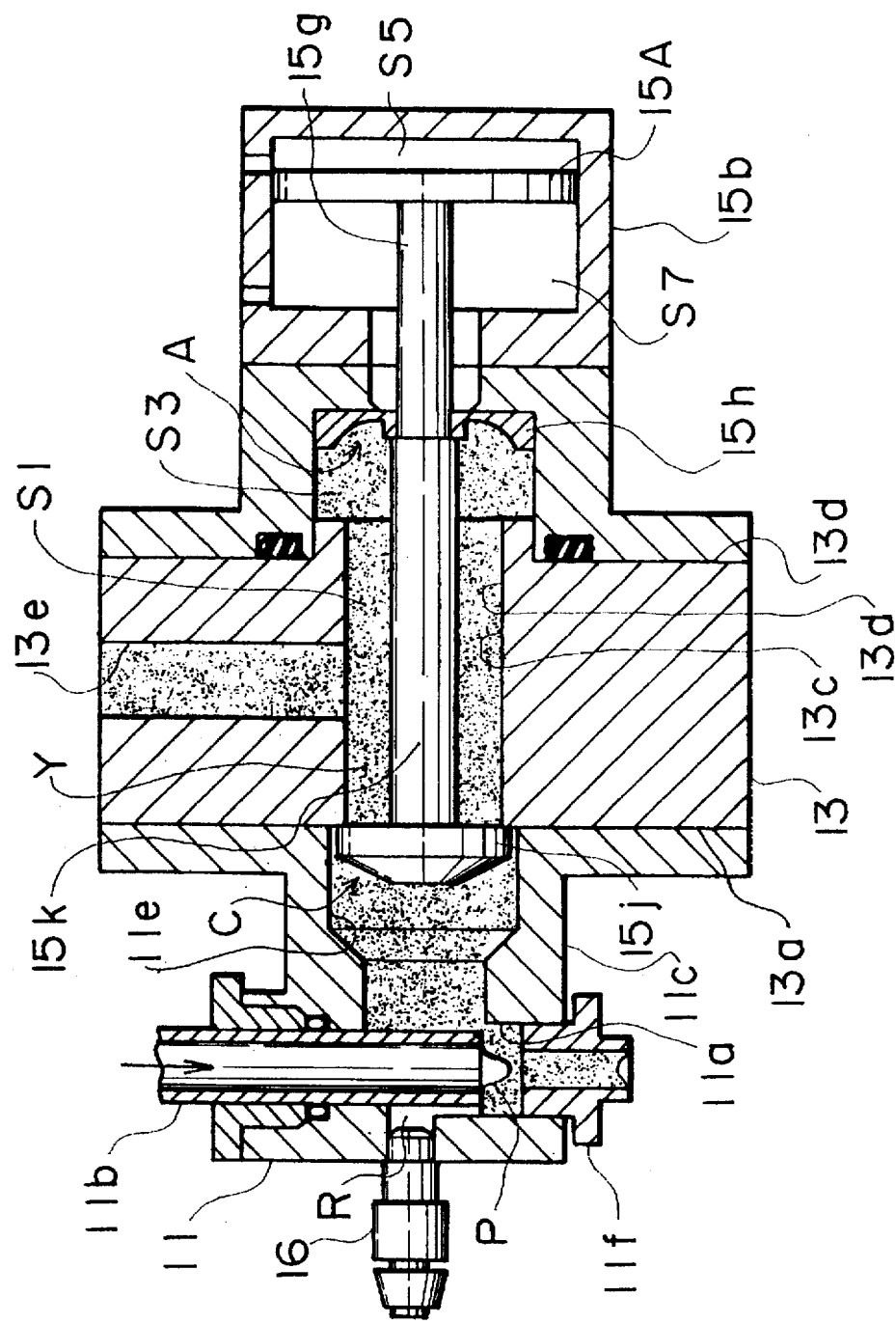
FIG. 7 is an explanation diagram illustrating an operation of the gel coat processing section shown in FIG. 1.

Next, by switching the solenoid valve 18 to the side of the speed controller 15f, the rod 15g is contracted together with the joint rod 15k as shown in FIG. 7 to move the diaphragm 15h from the discharge place B of the gel pumping chamber 15c to the suction place A thereof and to move the opening-closing valve 15j from the opening place D to the closing place C.

As a result, the gelatinizer Y is decreased by the amount of the gelatinizer which has flown into the gel containing chamber 13c with the movement of the opening-closing valve 15j, therefore, the filling pressure of the gelatinizer Y in the cylinder chamber 11e and the passageway 11a becomes negative, by which the gelatinizer Y which has remained with being attached to the lower end of the discharge nozzle 11f after dropping a coated seed Z from the nozzle block 11 is lifted slightly upward.

When the rod 15g is contracted with the joint rod 15k, most gelatinizer Y in a portion of the cylinder chamber 11e on the side of the gel containing chamber 13c from the opening-closing valve 15j flows into the gel containing chamber 13c through the gap E between the opening-closing valve 15j and the cylinder chamber 11e, the gelatinizer Y sent from the inside of the storing tank 17 to the gel passageway 13e by pressure flows into the gel containing chamber 13c, and then the gelatinizer Y in the gel containing chamber 13c flows into a portion of the gel pumping chamber 15c on the side of the gel containing chamber 13c from the diaphragm 15h such that it is pressed by the gelatinizer which has flown.

As a result, the gel containing chamber 13c closed by the opening-closing valve 15j and the portion of the gel pumping chamber 15c on the side of the gel containing chamber 13c from the diaphragm 15h are filled with the gelatinizer Y, and the filling pressure of the gelatinizer Y exceeds a sending pressure of the gelatinizer Y from the inside of the storing tank 17 to the gel passageway 13e so as to stop further sending of the gelatinizer Y to the gel passageway 13e by pressure.

Then, in a place of the gelatinizer Y in the lower portion of the seed supply pipe 11b out of the gelatinizer Y in the passageway 11a, a stagnant air P of the given size is generated again due to slight air discharged from the seed supply pipe 11b to return to the same state as that previous to putting the processing seed X from the upper portion of the nozzle block 11 into the seed supply pipe 11b as shown in FIG. 3.

Accordingly, by repeating the introduction of the processing seed X from the upper portion of the nozzle block 11 into the seed supply pipe 11b as shown in FIG. 4, the extending operation of the rod 15g and the joint rod 15k as shown in FIG. 5, and the contracting operation of the rod 15g and the joint rod 15k as shown in FIG. 7 sequentially afterward, the operation is repeated with supplying the gelatinizer Y to the discharge nozzle 11f, dropping the gelatinizer Y wrapping a processing seed X and a bubble Q, that is, a coated seed Z from the discharge nozzle 11f as shown in FIG. 6, and supplementing the gelatinizer Y by the amount of the dropped one in this order.

When the gelatinizer Y in the passageway 11a is discharged downward from the discharge nozzle 11f so as to wrap the stagnant air P in the lower portion of the seed supply pipe 11b and the processing seed X in it by the movements from the closing portion C of the opening-closing valve 15j to the opening place D thereof and from the suction place A of the diaphragm 15h to the discharge place B thereof with an extending operation of the rod 15g and the joint rod 15k, an increase or decrease of the amount of the gelatinizer Y from the storing tank 17 which flows into the passageway 11a together with the gelatinizer Y from the gel pumping chamber 15c by increasing or decreasing the sending pressure of the gelatinizer Y from the storing tank 17 increases or decreases the amount of the gelatinizer Y hanging in a form of a drop from the lower end of the discharge nozzle 11f, so as to adjust a size of the grain diameter of a coated seed Z dropped from the nozzle block 11.

As described above, according to the gel coat processing section 1 of this embodiment, it has a configuration that, when putting a processing seed X into the passageway 11a in the nozzle block 11 filled with the gelatinizer Y through the seed supply pipe 11b and dropping a coated seed Z made by coating the processing seed X with the gelatinizer Y in the passageway 11a from the passageway 11a, a diaphragm 15h fitted to the joint rod 15k connected to the tip of the rod 15g of the air cylinder 15b together with the opening-closing valve 15j is located in the discharge place B of the gel pumping chamber 15c when the opening-closing valve 15j is opened and located in the suction place A of the gel pumping chamber 15c when it is closed by opening or closing the apertures between the gel containing chamber 13c of the gel containing block 13 which communicates with the passageway 11a through the cylinder chamber 11e and to which the gelatinizer Y is sent by pressure from the inside of the storing tank 17 and the gel pumping chamber 15c of the cylinder block 15 communicating with the gel containing chamber 13c and between the gel containing chamber 13c and the passageway 11a by means of the opening-closing valve 15j.

Therefore, with the movement of the diaphragm 15h from the suction place A to the discharge place B, the gelatinizer Y of the amount used for generating a single coated seed Z which is almost equal to a volume difference between the places A and B in the gel pumping chamber 15c of the diaphragm 15h flows from the gel pumping chamber 15c and the gel containing chamber 13c into the passageway 11a through the opening-closing valve 15j which is opened and the cylinder chamber 11e, and the gelatinizer Y in the passageway 11a wraps a processing seed X which has been put into the passageway 11a from the seed supply pipe 11b and a stagnant air P generated in the gelatinizer Y in the passageway 11a from slight air discharged from the seed supply pipe 11b into the passageway 11a and hangs in a form of a drop protruding from the discharge nozzle 11f such that it is pressed away by the gelatinizer Y which has flown into the passageway 11a, so that a coated seed Z is dropped from the gel block 11.

Accordingly, it becomes possible to uniform an amount of coating on a processing seed X with gelatinizer Y, in other words, a grain diameter of a coated seed Z by dropping a uniform amount of gelatinizer Y from the passageway 11a independently of environmental conditions such as an ambient temperature of the device or bubbles mixed in the gelatinizer Y sent by pressure from the inside of the storing tank 17.

According to the gel coat processing section 1 of this embodiment, the diaphragm 15h is fitted to the tip of the rod 15g of the air cylinder 15b, the joint rod 15k is connected to the tip of the rod 16g, and the opening-closing valve 15j is fitted to the tip of the joint rod, therefore, an opening and closing operation of the opening-closing valve 15j can be easily linked with the movement of the diaphragm 15h between the suction place A and the discharge place B by means of the extension or contraction operation of the air cylinder 15b.

Further, according to the gel coat processing section 1 of this embodiment, a stagnant air P is generated in the gelatinizer Y in a place of the passageway 11a in the lower portion of the seed supply pipe 11b by discharging slight air from the seed supply pipe 11b into the passageway 11a so that a bubble Q is generated in a coated seed Z produced by dropping from the passageway 11a, therefore, it becomes possible to secure oxygen necessary for germination of the processing seed X and to prevent clogging of the seed supply pipe 11b at filling the passageway 11a with gelatinizer Y.

Still further, according to the gel coat processing section 1 of this embodiment, if the stagnant air P is going to exceed the given size due to continued discharge of the slight air from the seed supply pipe 11b, excess air stagnates in a space R between an outer circumferential wall at the lower end of the seed supply pipe 11b and an inside wall of the passageway 11a and the excess stagnant air in the space R is discharged to the outside of the nozzle block 11 by opening the air straight 16 in this configuration; hence the stagnant air P is always kept to a given size so as to prevent a generation of a stagnant air P greater than the given size such that it cannot be wrapped by gelatinizer Y, therefore, it becomes possible to manufacture coated seeds Z each having a uniform grain diameter more reliably.

Furthermore, according to the gel coat processing section 1 of this embodiment, it has a configuration that the diaphragm 15h is fitted to the tip of the rod 15g of the air cylinder 15b, therefore, a cylinder block 15 can be easily assembled only by adding the joint rod 15k, the diaphragm 15h, and the adapter 15a to a commercially-available air cylinder which is applied.

According to the gel coat processing section 1 of this embodiment, the air cylinder 15b is extended or contracted by compressed air from the air compressor 19, therefore, it becomes possible to use the air compressor 19 which is a source of slight air discharged from the seed supply pipe 11b into the passageway 11a and also a source of pressure for sending gelatinizer Y from the inside of the storing tank 17 into the gel containing chamber 13c through the gel passageway 13e as a power source of the air cylinder 15b so as to simplify the configuration of the device by means of a common use of the power source.

Further, according to the gel coat processing section 1 of this embodiment, it has a configuration that, when the gelatinizer Y in the passageway 11a is discharged downward from the discharge nozzle 11f so as to wrap a stagnant air P in the lower portion of the seed supply pipe 11b and a processing seed X in it, the amount of the gelatinizer Y separated from gelatinizer Y in the discharge nozzle 11f by gravity hanging in a form of a drop from the lower end of the discharge nozzle 11f by increasing or decreasing a pressure for sending gelatinizer Y from the storing tank 17 so as to adjust a size of the grain diameter of the coated seed Z dropped from the nozzle block 11.

Therefore, it becomes possible to change a size of the grain diameter of coated seeds Z easily without changing the gel coat processing section 1 partially nor entirely, for example, such as by a replacement with a discharge nozzle 11f having a diameter which is not given, but selected out of a plurality of types of discharge nozzles having different inner diameters from each other.

The size of the grain diameter of coated seeds Z dropped from the nozzle block 11 can be adjusted by increasing or decreasing a shift stroke of the rod 15g of the air cylinder 15b and the joint rod 15k at its tip or by increasing or decreasing a time period during which the opening-closing valve 15j is opened with an operation of the air cylinder 15b, in other words, a time period during which the opening-closing valve 15j is located in a place on the side of the opening place D rather than the closing place C as well as by increasing or decreasing a pressure for sending gelatinizer Y from the storing tank 17 as described in this embodiment.

In addition, the shift stroke of the rod 15g of the air cylinder 15b and the joint rod 15k at its tip can be increased or decreased by changing a cylinder length of the air cylinder 15b, and the time period during which the opening-closing valve 15j is located on the side of the opening place D rather than the closing place C can be increased or decreased by adjusting a pressure for injecting compressed air into the chambers S5 and S7 of the air cylinder 15b by means of the speed controllers 15e and 15f.

Further, although the gel coat processing unit of this embodiment has a configuration for coating a single processing seed with gelatinizer, it is also possible to have a configuration that a plurality of gel coat processing sections 1 are operated in parallel so as to coat a plurality of processing seeds with gelatinizer simultaneously.

Still further, the configuration of the gel coat processing unit to which this invention is applied is not limited to the gel coat processing unit 21 having the seed hopper 22, the seed transfer section 23, the gelatinizer tank 24, the hardening bath 26, and rinsing bath 27 described as conventional techniques, but this invention is also applicable to a gel coat processing unit having components of different configurations other than the gel processing section 25 or independently of presence or absence of the components.

As described above, according to a processing section in a gel coat processing unit for seeds of the present invention, the processing section wherein a seed is introduced from the outside to a passageway filled with gelatinizer and a coated seed made by coating the seed with the gelatinizer is dropped from the passageway, comprises a gel storing section to which the gelatinizer is supplied from the outside with communicating with the passageway, an opening-closing valve for opening or closing an aperture between the passageway and the gel storing section, and an extension-contraction member for extending or contracting an internal space of the gel storing section by moving in the gel storing section with being linked with opening or closing of the opening-closing valve, characterized by the extension-contraction member formed movably between the minimum place where the internal space of the gel storing section has the minimum capacity by positioning the extension-contraction member at the place corresponding to the opening valve of the opening-closing valve and the maximum place where the internal space of the gel storing section has the maximum capacity equal to the minimum capacity plus the amount of the gelatinizer used for coating the seed by positioning the extension-contraction member at the place corresponding to the closing valve of the opening-closing valve.

Therefore, linking with a change from a closed valve state to an opened valve state of the opening-closing valve for opening or closing the aperture between the passageway which is filled with gelatinizer and into which the processing seed is introduced from the outside and the gel storing section communicating with it, the extension-contraction member shifts from the maximum place where the internal space of the gel storing section has the maximum capacity to the minimum place where it has the minimum capacity, whereby gelatinizer of the amount used for a coated seed equal to a difference between the maximum capacity and the minimum capacity flows from the internal space of the gel storing section into the passageway through the opening-closing valve and the gelatinizer in this passageway is dropped from the passageway together with the processing seed introduced from the outside.

As a result, it becomes possible to uniform a coat amount for processing seeds with gelatinizer, in other words, a grain diameter of coated seeds by dropping a uniform amount of gelatinizer from the passageway independently of the environmental conditions such as an ambient temperature or bubbles mixed in gelatinizer, compared with the conventional one in which a plunger is moved by increasing a filling pressure of gelatinizer in a space to open a valve for dropping gelatinizer.

According to a processing section in a gel coat processing unit for seeds of the present invention, it further comprises a pipe for discharging compressed air into the gelatinizer in the passageway with its tip inserted into the passageway to introduce the processing seed from the outside of the passageway into a stagnant air generated at a portion of the gelatinizer faced by a tip of the pipe in the passageway due to the compressed air.

Accordingly, a bubble is wrapped by the gelatinizer together with the seed when the gelatinizer is dropped from the passageway, therefore, oxygen needed for germination of the seed can be secured in the coated seed by means of this bubble.

Furthermore, according to a processing section in a gel coat processing unit for seeds of the present invention, the tip of the pipe is inserted from the upper portion into the passageway, the upper portion from the tip of the pipe is closed, and an open space is formed with being surrounded in the lower portion of the tip of the pipe between the outside wall of the tip of the pipe and the inside wall of the passageway, and the space communicates with the outside of the passageway so that the aperture can be opened or closed by means of an air vent valve.

Accordingly, out of the compressed air discharged into gelatinizer in the passageway from the tip of the pipe inserted from the upper portion into the passageway, compressed air of an amount greater than a required amount for generating the stagnant air at the portion of gelatinizer faced by the tip of the pipe stagnates in the space between the outside wall of the tip of the pipe and the inside wall of the passageway and then the stagnant compressed air is discharged to the outside of the passageway through the air vent valve.

As a result, it becomes possible to prevent a failure of a coated seed due to a stagnant air too large to be wrapped by gelatinizer together with a seed since an excess compressed air stagnates in the passageway.

Further, according to a processing section in a gel coat processing unit for seeds of the present invention, supplying pressure to the gelatinizer supplied from the outside to the gel storing section is increased or decreased according to the size of the grain diameter of the coated seed dropped from the passageway, therefore, the size of the grain diameter of the coated seed can be changed without additional cost.

Still further, according to a processing section in a gel coat processing unit for seeds of the present invention, the opening-closing valve and the extension-contraction member are fixed to a piston rod inserted toward the place of the internal space of the gel storing section communicating with the passageway from the outside of the gel storing section of a cylinder continuously arranged in the outside of the gel storing section.

As a result, with the extending and contracting operation of the cylinder continuously arranged in the outside of the gel storing section, the opening-closing valve and the extension-contraction member fixed to the piston rod move integrally together with the piston rod inserted toward the place of the internal space of the gel storing section communicating with the passageway from the outside of the gel storing section, therefore, it becomes possible to realize easily an operation of the extension-contraction member interlocked with the opening-closing valve.

Furthermore, according to a processing section in a gel coat processing unit for seeds of the present invention, the cylinder is composed of an air cylinder operating by means of compressed air and the extension-contraction member is composed of a diaphragm removably attached to the piston rod inserted to the place of the internal space of the gel storing section by means of the air cylinder, therefore, the gel processing section can be easily formed only by adding the gel storing section and the diaphragm to which a commercially-available air cylinder is applied.

Still further, according to a processing section in a gel coat processing unit for seeds of the present invention, compressed air is supplied from a common supply source to the air cylinder and the pipe, therefore, the configuration can be simplified by means of a common use of the power source by using a supply source for supplying compressed air to the pipe also as a supply source for supplying compressed air to the cylinder.

According to a processing section in a gel coat processing unit for seeds of the present invention, a shift stroke of the piston rod caused by an operation of the cylinder is increased or decreased according to a size of a grain diameter of the coated seed dropped from the passageway.

Further, according to a processing section in a gel coat processing unit for seeds of the present invention, a time period during which the opening-closing valve opens an aperture between the passageway and the gel storing section by means of the operation of the cylinder is increased or decreased according to the size of a grain diameter of the coated seed dropped from the passageway.

Therefore, it becomes possible to change a size of a grain diameter of the coated seed without additional cost in the same manner as for the processing section in the gel coat processing unit for seeds of the present invention in both cases.

What is claimed is:

1. A processing device in a gel coat processing unit for seeds for manufacturing gel-coated seeds made by coating seeds with polymeric gel, wherein said seed is introduced from an outside into a passageway filled with a gelatinizer which becomes said polymeric gel by hardening and a coated seed made by coating said seed with said gelatinizer is dropped from said passageway, comprising:

a gel storing means for communicating with said passageway, wherein said gel storing means is supplied with said gelatinizer from an outside thereof;

an opening-closing valve for opening and closing an aperture between said passageway and said gel storing means; and an extension-contraction member for extending and contracting an internal space of said gel storing means, said extension-contraction member moving in said gel storing section linked with an opening and closing of said opening-closing valve, said extension-contraction member being movable between a first position where an internal space of said gel storing means has a minimum capacity corresponding to a position when said opening-closing valve is opened and a second position where said internal space of said gel storing means has a maximum capacity which is equal to said minimum capacity plus an amount of said gelatinizer used for said coated seed corresponding to a position when said opening-closing valve is closed.

2. The processing device in a gel coat processing unit for seeds as claimed in claim 1, further comprising:

means for discharging compressed air into said gelatinizer in said passageway, wherein said discharging means is a pipe having a tip which is inserted into said passageway to introduce said seed from said outside of said passageway into a stagnant air generated at a portion of said gelatinizer faced by said tip of said pipe in said passageway due to said compressed air.

3. The processing device in a gel coat processing unit for seeds as claimed in claim 2, wherein said tip of said pipe, which is inserted from an upper portion into said passageway, forms an open space between an outside wall of said tip of said pipe and an inside wall of said passageway such that an upper portion thereof from said tip of said pipe is opened, and said space communicates with said outside of said passageway so that an aperture between said space and said passageway can be opened and closed by means of an air vent valve.

4. The processing device in a gel coat processing unit for seeds as claimed in claim 1, further comprising an pressure supplying means for supplying pressure to said gelatinizer, which is supplied from said outside to said gel storing means, said pressure being increased and decreased according to a grain diameter of said coated seed dropped from said passageway.

5. The processing device in a gel coat processing unit for seeds as claimed in claim 1, wherein said opening-closing valve and said extension-contraction member are fixed to a piston rod of a cylinder continuously arranged in said outside of said gel storing means, said piston rod being inserted toward a place of said internal space of said gel storing means communicating with said passageway from said outside of said gel storing means.

6. The processing device in a gel coat processing unit for seeds as claimed in claim 5, wherein:

said cylinder is composed of an air cylinder operated by means of compressed air and said extension-contraction member is composed of a diaphragm removably attached to said piston rod inserted to said place of said internal space of said gel storing means.

7. The processing device in a gel coat processing unit for seeds as claimed in claim 6, further comprising a means for supplying compressed air which is common to both said air cylinder and said pipe.

8. The processing device in a gel coat processing unit for seeds as claimed in claim 5, wherein said piston rod has a variable shift stroke, said variable shift stroke being caused by an operation of said cylinder and a length of said variable shift stroke being increased and decreased according to a grain diameter of said coated seed dropped from said passageway.

9. The processing device in a gel coat processing unit for seeds as claimed in claim 6, wherein a time period, during which said opening-closing valve opens an aperture between said passageway and said gel storing means by means of said operation of said cylinder, is variable and said variable time period is increased and decreased according to a grain diameter of said coated seed dropped from said passageway.

* * * * *